United States Patent [19]

Bartley

[11] 4,221,520

[45] Sep. 9, 1980

[54] APPARATUS FOR SUPPLYING WOOD FIBER MATERIAL TO A PULP PAPER PLANT THROUGH A SINGLE OFF-LOADING STATION

[75] Inventor: Thomas S. Bartley, Mobile, Ala.

[73] Assignee: International Paper Company, New York, N.Y.

[21] Appl. No.: 916,882

[22] Filed: Jun. 19, 1978

[51] Int. Cl.² .............................................. B65G 67/48

[52] U.S. Cl. .................................... 414/355; 198/436; 414/356

[58] Field of Search ............... 414/340, 343, 345, 346, 414/349-353, 354-356, 359, 366; 198/366, 370, 371, 436

[56] References Cited

U.S. PATENT DOCUMENTS

| | | | |
|---|---|---|---|
| 758,191 | 4/1904 | Robertson . | |
| 3,211,308 | 10/1965 | Glass . | |
| 3,443,676 | 5/1969 | Bilocq | 198/436 X |
| 3,640,411 | 2/1972 | Anderson | 414/340 X |
| 3,767,065 | 10/1973 | Hall et al. . | |
| 3,993,203 | 11/1976 | Bartley | 414/360 |

FOREIGN PATENT DOCUMENTS

| | | |
|---|---|---|
| 49623 | 4/1965 | Poland . |

*Primary Examiner*—Robert G. Sheridan
*Attorney, Agent, or Firm*—Finnegan, Henderson, Farabow, Garrett & Dunner

[57] ABSTRACT

Method and apparatus for supplying wood fiber material in both roundwood and chip form to a pulp paper plant through a single off-loading station having a rotary railroad car dumper for unloading fiber material to a receiver box including a platform for receiving the fiber material transferred at an elevated position from the receiver box, a wall for guiding material being transferred onto the platform, and a plurality of plows for segregating the wood fiber material and for moving the roundwood and chip materials along the deck in separate directions toward separate conveying systems.

9 Claims, 7 Drawing Figures

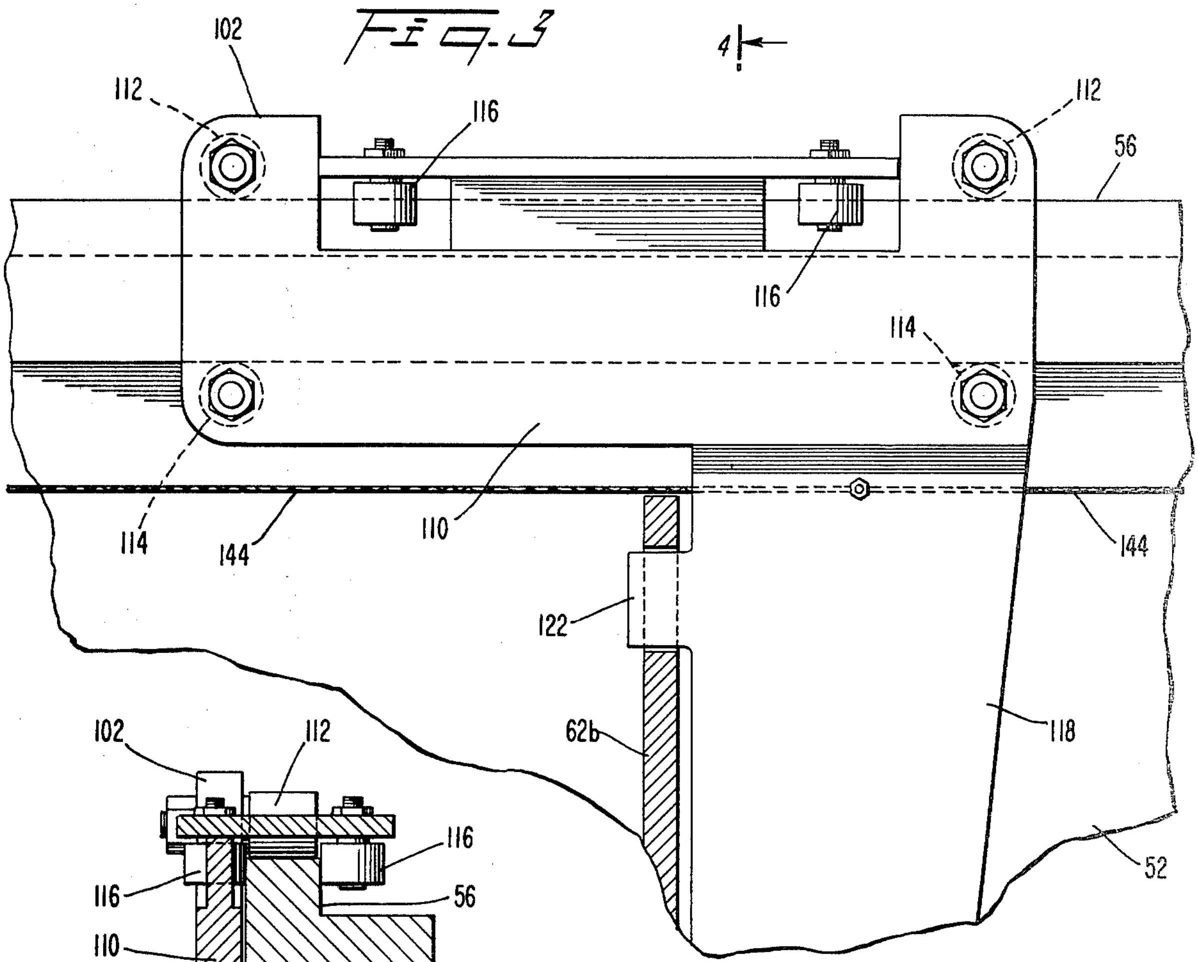
Fig. 3
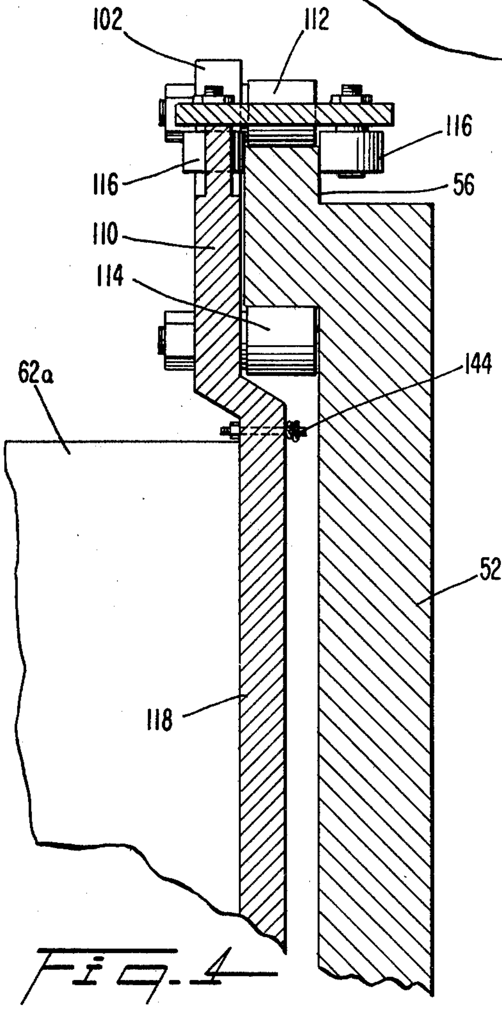
Fig. 4
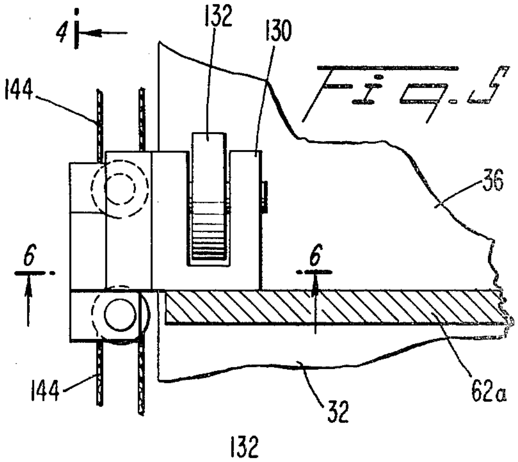
Fig. 5
Fig. 6
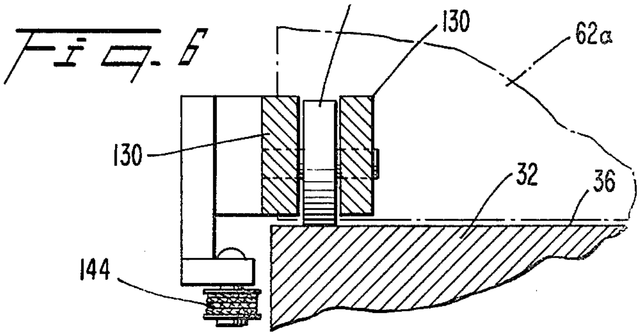

APPARATUS FOR SUPPLYING WOOD FIBER MATERIAL TO A PULP PAPER PLANT THROUGH A SINGLE OFF-LOADING STATION

BACKGROUND

1. Field of the Invention

The present invention pertains to a method and apparatus for supplying a manufacturing operation with materials in different forms through a single off-loading station.

2. Brief Description of the Prior Art

Large scale manufacturing operations frequently require the continuous supply of materials and fuel used in the manufacturing process, which materials must be delivered to the site of the manufacturing operation on a fairly continuous basis. A paper plant is typical of such operations, as wood fiber materials in large quantities are consumed daily in the paper manufacturing process. Daily consumption rates on the order of 5,000 tons of fiber materials are not uncommon for modern, large scale operations. The wood fiber material is usually received at the paper plant site in either chip form or in "roundwood", that is, logs. The roundwood is subsequently reduced to ship form and the chips are processed to form a fiber slurry which is fed to the paper making machine.

FIG. 1 is a schematic of a typical pulp paper plant layout. In FIG. 1, railroad track systems A and B with attendant off-loading facilities are used for supplying roundwood and a separate track system C for supplying fiber material in chip form. This conventional separation of receiving stations for chips and roundwood reflected the different process paths taken by the two wood fiber material forms and has necessitated the expenditure of substantial sums for duplicate railroad systems and material handling and conveying apparatus. Potential cost savings exist for a system and apparatus such as that described in the present invention which can accomplish the supply of different raw materials through a single off-loading station.

The present trend is to consolidate pulp paper plants such as shown in FIG. 1 with wood processing plant operations to make more effective use of the residual by-products from the wood processing plants. Wood processing plants typically produce finished wood items such as lumber, plywood, etc. with the wood residues going to produce chips and the bark going to provide fuel for the associated pulp paper plants. Hence, for such combined operations, the roundwood received at the off-loading stations would be in tree-length form as well as the 5 feet, 3 inch standardized pulp wood length. The method and apparatus described herein can advantageously and economically handle tree-length roundwood as well as pulp wood-length logs.

The usual manner of conveyance of the wood fiber raw materials to a pulp paper plant is by means of open-topped railroad cars, as can be appreciated from a review of FIG. 1. However, in certain situations it may be more economically advantageous to ship by highway truck-trailer, especially in view of the rigid rate structure under which present railroad shipments must conform. This economic advantage is pronounced for combined wood product and pulp paper plants since the rate for transporting roundwood by rail in tree-lengths is disproportionately greater than the cost for rail-transporting roundwood in pulp wood-lengths, reflecting the higher potential finished value of the products exiting the wood product plant. Hence, the method and apparatus disclosed herein for unloading wood fiber material delivered in both railroad cars and highway truck-trailers is particularly advantageous.

The unloading of the fiber matrial-laden, open-topped railroad cars in pulp paper plants can be accomplished by the use of a rotary railroad car dumper equipped with an elevated receiver box, such as shown in U.S. Pat. No. 3,993,203 to Bartley. Advantages of such rotary railroad car dumpers, having apparatus for inverting the entire railroad car and causing the contents to spill into the captive receiver box, include relatively short cycle times, maintenance of the orderly stacking of tree-length roundwood subsequent to the inversion of the railroad car, and reduction in the overall waste of fiber material that occurs each time the material is placed in unconfined storage, such as on the ground. The method and apparatus of the present invention enables the full benefits of such rotary dumpers to be realized.

SUMMARY OF THE INVENTION

In accordance with the invention, as embodied and broadly described herein, the apparatus of this invention for receiving, segregating, and temporarily storing material transferred at an elevated position from a receiver box of a rotary railroad car dumper, the material being one of at least two forms, the material also being expelled from the dumper along an unloading axis, comprises stationary platform means in a horizontally disosed planar deck member, and means for supporting the deck member substantially at the elevation of the receiver means for coupling the receiver box to the platform means for guiding material being expelled onto the deck member; means cooperating with the platform means and the coupling means for plowing the expelled material along the deck member in a selectable one of a plurality of directions, the dimensions of the deck member in each of said plurality of directions being sufficient to store temporarily the segregated material.

Preferably, the unloading axis is parallel to the axis of rotation of the dumper and the material is expelled through an opening at one end of the receiver box, and the coupling means includes a vertical planar wall member fixedly attached, and perpendicular, to the deck member, the end of the receiver box through which the material is expelled being parallel to and in sliding engagement with the wall member, the wall member also having an aperture for alignment with the receiver box opening when the receiver box is in its coupled position.

It is also preferred that the plowing means moves the expelled material in the selected direction along an axis perpendicular to the unloading axis, and that the plowing means further including a plurality of vertically disposed plowing members each having a planar face oriented perpendicular to the plowing axis, a bottom edge parallel to the upper surface of the deck member, and a pair of opposite ends, the one of the ends proximate the wall member having a vertical edge; tracking means cooperating with both of the ends of each of the plowing members for guiding each plow member in translating motion along the plowing axis and for supporting the bottom edge above the deck member and for spacing the vertical edge of each of the gate members from the wall member distances sufficient to allow relative motion therebetween; and means for translating each of the plurality of plowing members along the plowing axis, the deck member and the wall member acting to channel the material being moved by action of the plowing member, the translating means including a cable drive means connected to both of the ends of each of the plurality of plowing members, and each of the plowing member including hinge means connecting the one of the ends proximate the wall member with the track means for accommodating canting of the plowing member during uneven loading thereof.

Further in accordance with the invention, as embodied and broadly described herein, the method of this invention for supplying wood fiber material to a pulp paper plant using a single off-loading station, the fiber material being in chip form and in round-wood form, the wood fiber material also being delivered to the site of the pulp paper mill by a first set of railroad cars and by highway vehicles, the railroad cars and highway vehicles arriving in random order, and each of the railroad cars and highway vehicles containing all roundwood or all chips but not an admixture, comprises transferring highway vehicle-borne fiber material to a second set of railroad cars at a location near the off-loading station; unloading the wood fiber material by inverting one-at-a-time both the first and second set of railroad cars in a rotary dumping means, the unloaded fiber material being maintained in the rotary dumper at an elevated position relative to the top-most part of the railroad cars after each emptying event; transferring the unloaded fiber material from the rotary dumping means to a fiber material segregrating means immediately after each unloading event, the transferring step being accomplished while maintaining the material in the elevated position; segregating and directing the fiber material toward one or the other of two conveying systems, the roundwood type of fiber material being directed to one of the two conveying systems and chip-type fiber material being directed to the other, the directing step being accomplished by the segregating means; and conveying the unloaded and segregated fiber material away from the off-loading station by the respective conveying systems for utilization in the pulp paper manufacturing process.

Preferably, the method further includes performing the steps of temporarily storing both sets of loaded railroad cars in a switch yard prior to the emptying step, and sequencing for unloading from among the temporarily stored cars according to the type of fiber material contained therein, the sequence for maximizing the total through-put of fiber material at the off-loading station and the sequence being determined in part by the respective capacities of the two conveying systems. It is also preferred that the unloaded and segregated fiber material is temporarily stored on the sorting means and that the steps of unloading, segregating, and directing the fiber material are carried out concurrently with the step of conveying material previously unloaded and temporarily stored.

It is also preferred that the highway vehicles are truck-trailers and that the transferring step includes the use of a "set out" trailer system for receiving the trailer-borne loads of fiber material.

And it is also preferred that bark fuel material is unloaded at the single off-loading station in addition to the chip and roundwood fiber materials, the bark fuel material being delivered to the site in the railroad cars and highway vehicles containing either all bark fuel or a mixture of bark fuel and roundwood, that the roundwood conveying system includes debarking apparatus, and that the method further comprises the steps of segregating and directing the bark fuel material toward the roundwood conveying system and of subsequently separating and diverting the bark fuel material from the roundwood conveying system, the separating and diverting step being accomplished by the debarking apparatus.

BRIEF DESCRIPTION OF THE DRAWING

The accompanying drawing, which is incorporated in and constitutes a part of the specification, illustrates one embodiment of the invention and, together with the description, serves to explain the principles of the invention.

FIG. 3 is a detail of one component of the apparatus in FIG. 2.

FIG. 4 is another view of the component shown in FIG. 3.

FIG. 5 is a detail of another component of the apparatus shown in FIG. 2.

FIG. 6 is another view of the component shown in FIG. 5.

DESCRIPTION OF THE PREFERRED EMBODIMENT

Reference will now be made in detail to the present preferred embodiment of the invention, an example of which is illustrated in FIGS. 2–7 of the accompanying drawing.

Figure 2:
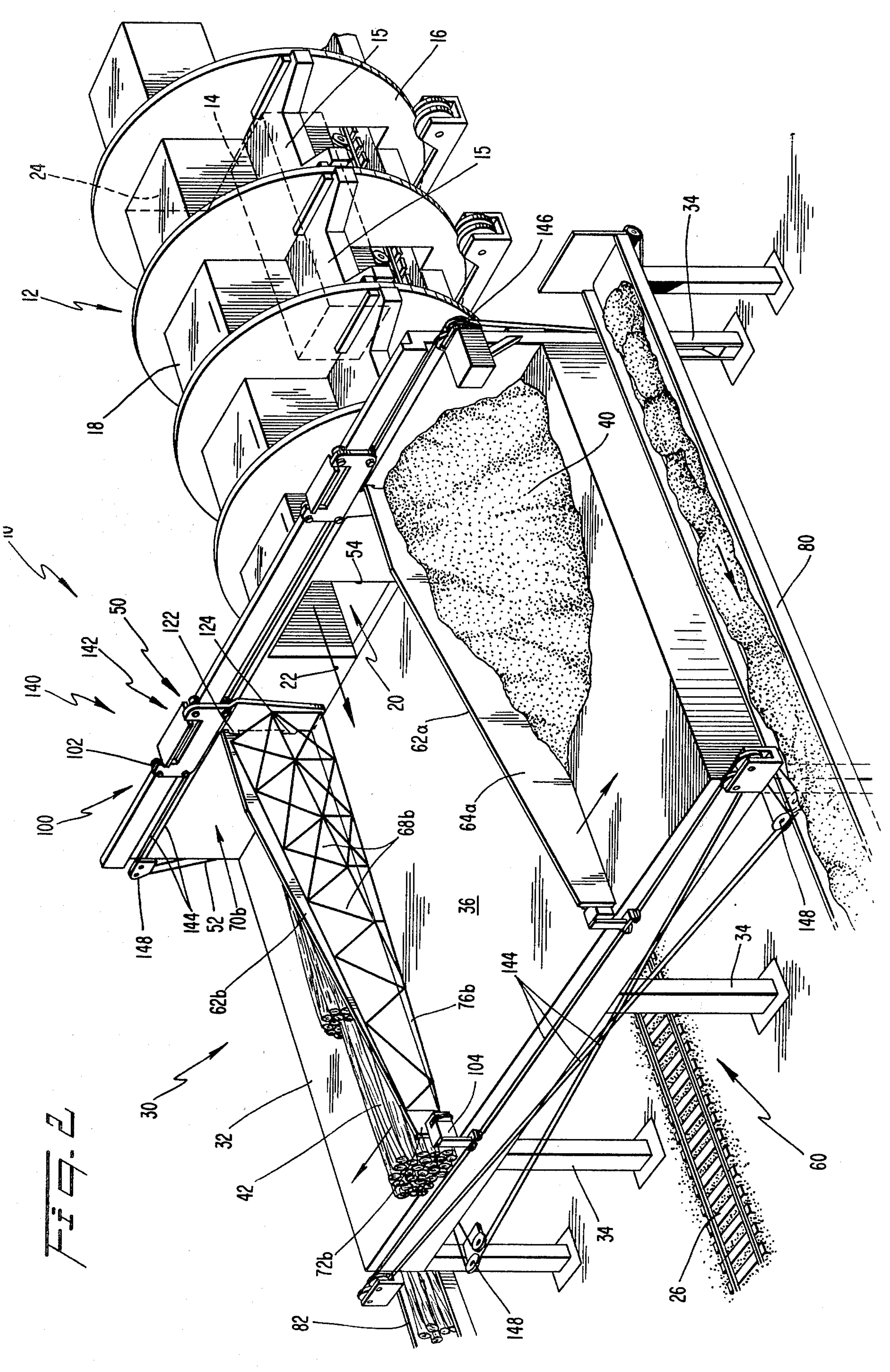
FIG. 2 is an isometric view of apparatus of the present invention for receiving, sorting and temporarily storing material expelled from a rotary railroad car dumper.

Referring to FIG. 2, there is shown apparatus 10 for receiving, sorting and temporarily storing material transferred from rotary car dumpers, such as dumper 12. Dumper 12 is of the type wherein individual open-type railroad cars such as car 14 which enter dumper 12 along track 26, are positioned and clamped within rotatable frame 16, and are subsequently inverted. Upon rotation of frame 16, the material in car 14 spills into an open-topped receiver box 18 which is inverted in the normal rest position shown in FIG. 2. After inversion of railroad car 14, a sliding cover 15 is used to capture the unloaded material in box 18 to prevent the unloaded material from spilling back into car 14.

Upon the return of rotatable frame 16 to the rest position, the material is removed from dumper 12, usually by expelling the material through an open end of box 18, such as end 20, along the long axis of box 18, such as unloading axis 22. In the dumper shown in FIG. 2, movable end wall 24 of receiver box 18 is used as a piston to effect the transfer.

A rotary dumper having a receiver box suitable for use in the unloading application is shown in U.S. Pat. No. 3,993,203, but the present invention is not intended to be limited to the use of the dumper shown in that reference. Any suitable rotary dumper that utilizes an elevated receiver box permitting removal of contents to a position elevated with respect to the railroad cars can be used in the present invention.

In accordance with the present invention, as best seen in FIG. 2, apparatus 10 includes platform 30 for receiving material transferred from rotary dumper 12. Platform 30 is comprised of a horizontal planar deck member such as deck 32 and means for supporting the deck above track 26 which is usually at ground level. Standard structural support means such as columns 34 are used in the embodiment shown in FIG. 2 to maintain the upper surface 36 of deck 32 at substantially the elevation of receiver box cover 15 with dumper 12 in rest position. Material in an ordered array, such as stacked tree-length roundwood, moved along unloading axis 22 by movable end wall 24 is thus transferred directly onto deck 32 with a minimum of disruption of orientation due to the lack of significant changes in elevation.

As herein embodied, apparatus 10 is used in a system for supplying raw wood fiber material in roundwood and chip form to a pulp paper processing mill or to a combined wood processing and pulp paper operation. The roundwood is delivered in either pulp wood-length or tree-length (30′ to 60′). FIG. 2 illustrates both chip and tree-length roundwood fiber materials, 40 and 42 respectively, positioned on deck 32, with the two stacks of tree-length roundwood having been delivered in tandem in a single railroad car load.

Hence, the dimension of deck 32 in the direction of unloading axis 22 should be at least 1⅝ times the average tree length or about 65 feet to accommodate tandem loading and to compensate for a possible unfavorable weight distribution of the tapered logs. Of course, deck 32 must be designed and constructed for maximum anticipated loads for the particular materials being handled. Such considerations are well within the skill of one designing and building structures for unloading bulk material.

In accordance with the invention, apparatus 10 also includes means 50 to couple receiver box 18 to platform 30 to guide material being expelled from dumper 12 onto deck 32. As herein embodied, and as best seen in FIG. 2, coupling means 50 includes a planar wall member 52 having an aperture 54 with substantially the dimensions of open end 20 of the receiver box 18. Wall member 50 is fixed to deck 32 and oriented perpendicular to both deck 32 and unloading axis 22. Wall member 50 is adapted to be in sliding engagement with end 20 of receiver box 18 in the normal rest position so that the edges of aperture 54 coincide with the corresponding edges of open end 20 of receiver box 18. This coincidence insures a minimum of structural interference during transfer of material.

Figure 1:
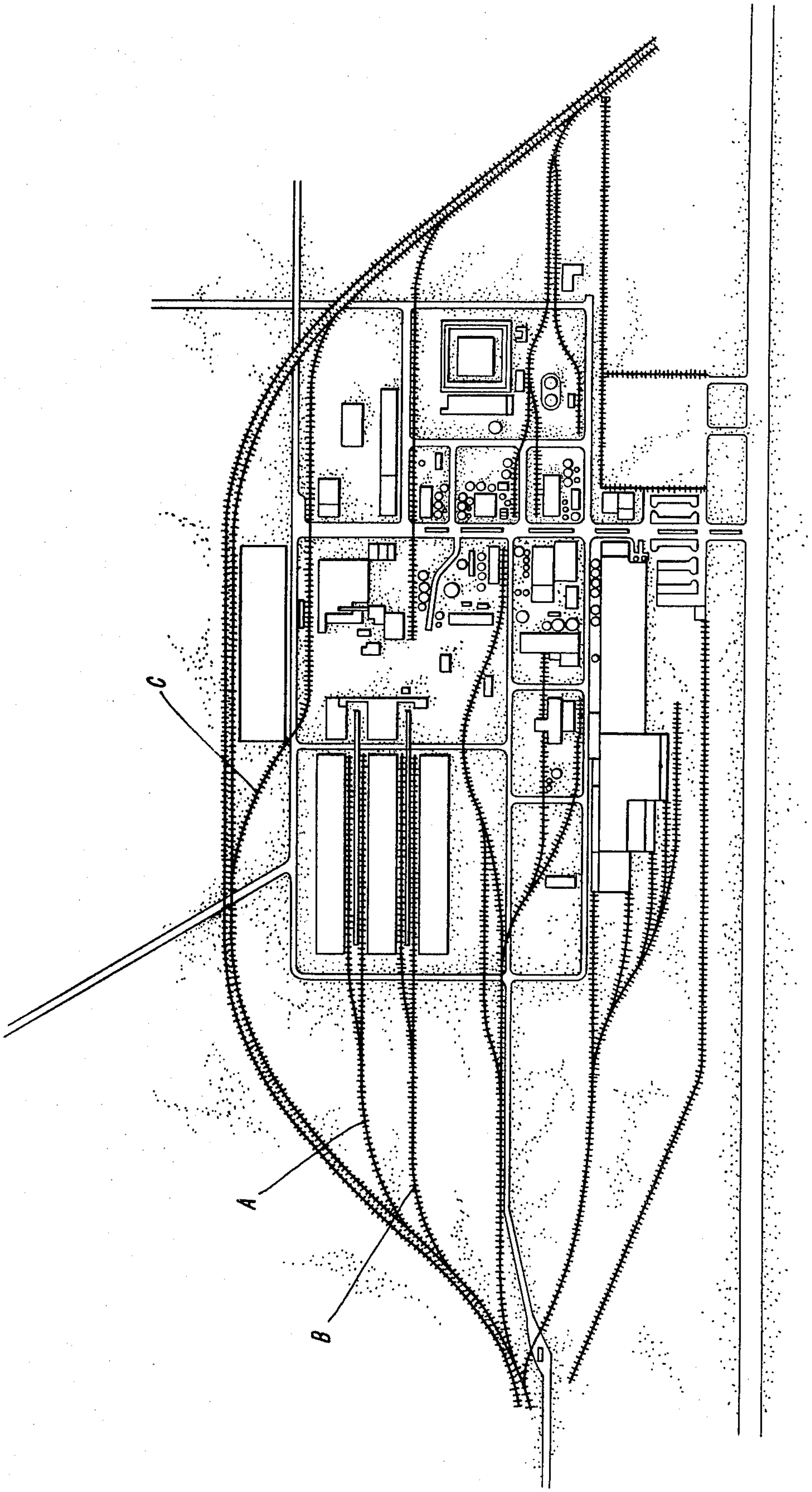
FIG. 1 PRIOR ART
FIG. 1 is a schematic of a prior art pulp paper plant layout.

In accordance with the invention, apparatus 10 also includes means 60 for plowing the material received from dumper 12 along deck 32 in different directions according to the type or form of material unloaded from a particular railroad car. It is tacitly assumed that each railroad car will carry material of only one type or form, such as either roundwood or chips for the pulp paper plant application depicted in FIG. 1. However, apparatus 10 permits railroad cars carrying materials of different forms to be unloaded in random sequence at the same off-loading station, with the action of the plowing means 60 acting to segregate the material and direct it to appropriate conveying means 80 and 82, for further processing in accordance with the characteristics and requirements of the respective material type.

Figure 7:
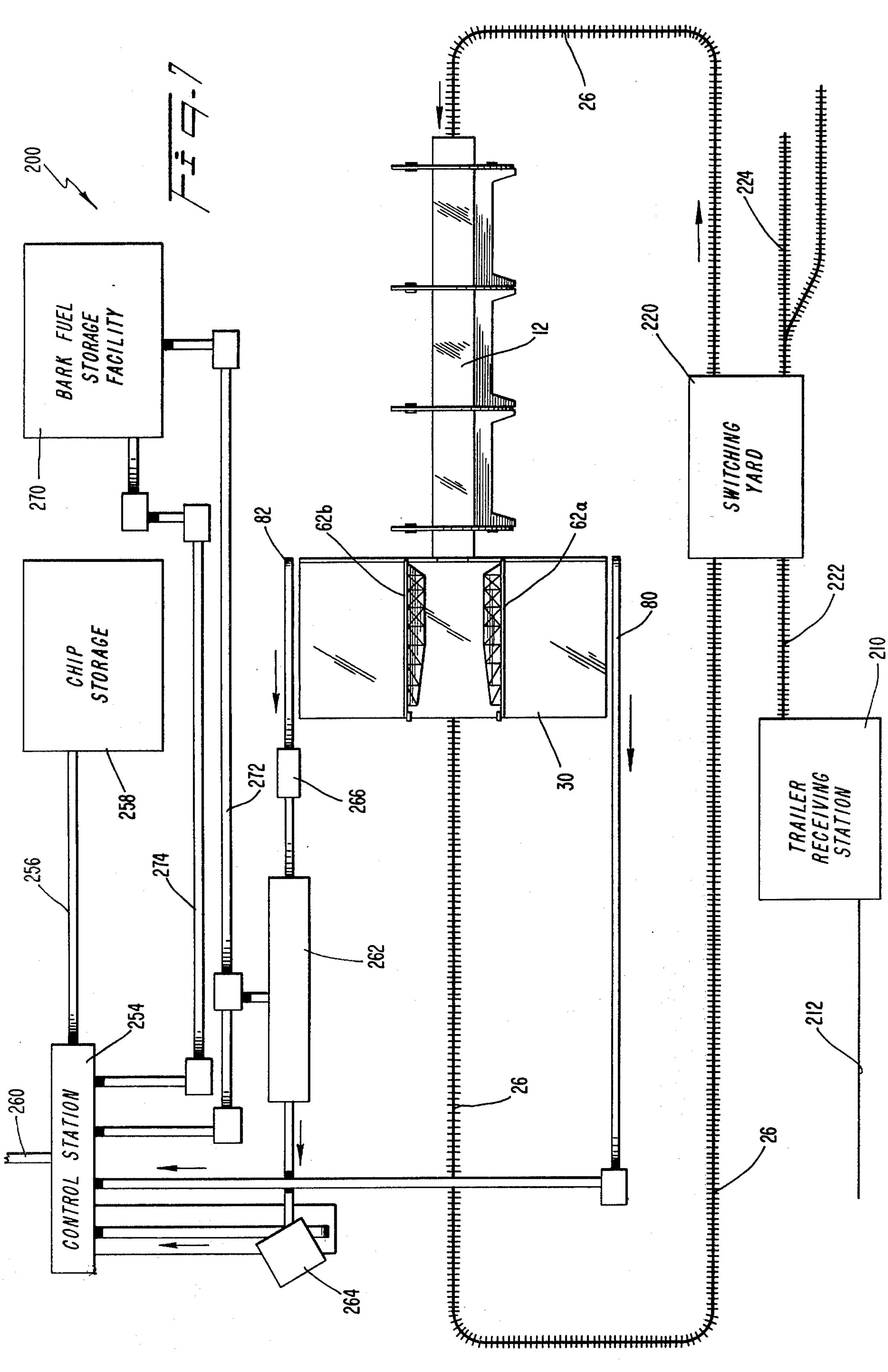
FIG. 7 is a schematic of an off-loading station utilizing the method and apparatus of the present invention.

In the pulp paper plant application, for instance, roundwood such as logs 42 can be debarked and then reduced to chip form before being transported to the pulping process or stored as fiber inventory. These different operations necessitate different conveying paths as is shown in FIG. 7 and as will be explained in more detail hereinafter.

As embodied herein, and with continued reference to FIG. 2, plowing means 60 includes a plurality of plowing members such as plowing members 62*a* and 62*b*. Preferably, two plowing members are utilized for moving material in translating motion in a direction perpendicular to the unloading axis 22. As shown in FIG. 2, plowing member 62*a* acts to move material in chip form to conveyor 80 while 62*b* plows roundwood in the direction of conveyor 82.

Each plowing member is vertically disposed and has a generally planar plowing face, such as face 64*a* of plowing member 62*a*. The side of the plowing member opposite the plowing face can be of any convenient shape. Opposite side 66*b* of plowing member 62*b* is shown including a network of light-weight structural members 68*b* arranged in geodesic shapes to provide lengthwise structural rigidity.

As herein embodied, plowing means 60 further includes track means 100 for guiding each plowing member in the respective plowing direction. For the application shown in FIG. 2, individual guide member 102 and 104 are provided at the opposed ends of each plowing member, such as ends 70*b* and 72*b* of plowing member 62*b*, for connecting the ends with the platform 30. These guide members act to support the bottom edge of the plowing member, such as edge 76*b* of plowing member 62*b*, above the upper surface 36 of deck 32 and space the proximate plowing member edge, such as edge 70*b*, from wall member 52, distances sufficient to allow motion of plowing member 62*b* relative to platform 30.

Referring to FIGS. 3 and 4, wall member 52 includes a rail member 56 for providing engagement with the guide members on the proximate ends of the respective plowing members. Again taking plowing member 62*b* as representative, guide member 102 includes a frame 110 on which are mounted sets of rollers 112, 114 and 116 for capturing rail member 56 and constraining frame 110 to motion along rail 56. Thus, roller sets 112 and 114 act to prevent excessive vertical motion while roller sets 116 prevent excessive lateral motion. The rollers can be mounted in any conventional fashion such as on pins fixed to the frame 110, as shown.

As can best be seen in FIGS. 5 and 6, guide member 104 of the distal end of plowing member 62*b* includes frame 130 for supporting roller element 132 for engaging surface 36 of deck 32. Frame 130 is fixed to plowing member 62*b* in conventional fashion.

As embodied herein, plowing means 60 includes means 140 for moving plowing members 62*a*, 62*b* in translation across deck 32 along an axis perpendicular to unloading axis 22. Preferably, means 140 includes a cable drive system 142 operatively connected to both ends of the individual plowing members, such as ends 70*b* and 72*b* of plowing member 62*b*. FIGS. 3–6 show cables 144 attached to frames 110 and 130 of guide members 102 and 104 respectively and appropriately connected to cable drive apparatus, such as drive pulleys 146. Force is applied to both ends of each plowing member by any conventional cable arrangement, such as by using a single drive pulley for each plowing member and using transfer pulleys, such as pulleys 148, to transmit force perpendicular and lateral to the line of action of the drive pulley. Such pulley and cable arrangements are known in the art.

The action of the translating individual plow members, such as plow *62b*, in cooperation with the deck 32 and wall member 52, channels the roundwood material expelled from dumper 12 in the direction of conveyor means 82. Plow member *62b* can either move the unloaded material directly onto the conveyor 82 or, if the dimension of the deck 32 in the plowing direction is great enough, the plowed material can be temporarily stored at a position intermediate the loading axis 22 and conveyor means 82. This temporary storage function is especially important if the cycle time for the rotary dumper is short compared to the time required to convey away a load of roundwood, or chips for the case of plow member *62a*. Excess capacity allows successive loads of the same material type to be off-loaded before the need to unload cars carrying material of the other form. Both conveying means 80 and 82 can thus be maintained in operation through suitable scheduling and sequencing of the railroad cars.

Referring once again to guide means 102, frame 110 is connected to plowing member *62b* through plow support member 118. Preferably, whenever a cable drive means such as cable drive 142 is utilized, a hinge means 120, including hinging elements 122 and 124, is used to couple plowing member *62b* to support member 118 thereby allowing rotation about a vertical axis close to edge *70b* to prevent binding of the drive means caused by canting of the plow member. Canting can occur when eccentric loads on the plowing member face causes uneven stretching in the cables driving the respective ends of a plowing member.

Benefits and advantages of the present invention are readily apparent from the following description of the operation of the novel receiving and segregating deck with a rotary dumper in a single off-loading station for supplying wood fiber materials to a pulp paper plant. FIG. 7 shows a schematic of off-loading station 200 for receiving segregating, and distributing wood fiber material in both roundwood and chip form and carried in either open-top railroad cars or open-top highway trailers.

Further in accordance with the invention, and being the first step in the process for off-loading the wood fiber materials, the fiber materials carried by highway trailers are transferred to railway cars. Referring to FIG. 3, there is shown a trailer-receiving station 210 with highway access means such as road 212. In station 210, the trailer loads can be transferred into empty, gondola-type railroad cars, or, preferably, the trailers can be detached from the truck vehicles and "piggy-backed" on flat-cars, with appropriate tie-down apparatus. As herein embodied, a system of "set-out" trailers is used in station 212 to accommodate peak trailer traffic. In such systems, commonly used in truck-trailer shipping, a driver enters station 210 via access road 212, disengages from his loaded truck, connects to an entry trailer, and is thereby able to leave immediately. A captive truck vehicle is used to move the loaded trailer and position it for material transfer.

In accordance with the invention, the next step in the process is unloading the railroad cars one-at-a-time in rotary dumper 12 of the elevated receiver-box type, as was described previously. The material-laden railroad cars exiting from trailer stations 210 along railroad spur 222 or entering off-loading station 200 from a railroad line along access spur 224 are channeled to the dumper 12 along railroad spur 26. Spurs 222 and 224 can be connected directly to spur 26 or, as herein embodied, through railroad switching yard 220 in which the material-laden cars can be temporarily stored for accommodating peak railroad traffic.

Preferably, prior to entering spur 226 the railroad cars are sequenced for unloading, such as in switch yard 220, for maximum material through-put according to the material type and the respective material handling capacities of the dumper 12, the sorter 30 and conveying systems 80 and 82. The sequenced cars are then directed to the dumper 12 along spur 26 using a yard engine or a conventional captive-train system.

In accordance with the invention, and being the next step in the off-loading process, the material unloaded from each railroad car is immediately removed from rotary dumper 12 to sorting deck 30 which is elevated with respect to spur 26. For rotary dumpers of the type shown in U.S. Pat. No. 3,993,203, this is easily accomplished by the travelling end wall piston cooperating with the elevated receiving box, as was described previously.

Following the removal step, and in accordance with the invention, the material is directed along sorting deck 30 toward conveying systems 80 and 82 by either plow member *62a* or plow member *62b* depending whether the particular wood fiber material unloaded is in chip or roundwood form. The utilization of a particular plowing member, depending upon the material type, acts to segregate the materials for channeling to separate processing paths in the pulp paper plant operation, as will be described shortly.

In accordance with the invention, and being the final step in the process of supplying wood fiber material to a pulp paper plant through a single off-loading station, the directed material is conveyed away from the sorting deck 30. Conveyor system 80 carries chip material to control station 254, where is is subsequently directed either along conveyor 256 to chip storage 258 or to the digestion apparatus (not shown) along conveyor 260, depending on the pulp paper operation requirements at the particular time. Conveyor system 82 carries roundwood to debarking apparatus 262 and through chipping apparatus 264. The chip material from chipping apparatus 264 is finally carried to control station 254 for appropriate further processing.

As herein embodied, if roundwood is received in both pulp wood-length and tree-length form, conveyor system 82 also includes a shear 266 for shearing tree-length roundwood to pulp wood length, the pulp wood length logs passing through the shear without being acted upon. Shearing apparatus such as shear 266 is known in the art. As also embodied herein, the sorting deck 30 is equipped with temporary storage capacity for both material types. This capacity further contributes to maximizing of the total fiber material through-put at off-loading station 200 by permitting the directing and conveying steps to proceed concurrently with the unloading and removal steps in a manner discussed previously. Hence, the particular amount of excess capacity for sorting deck 30, and thus the dimension of deck 30 perpendicular to the unloading axis, would be determined in a known fashion during the analysis of the overall system operation and selection of components. However, the deck 30 should have a storage capacity equal to at least two times the receiver box volume in each plowing direction for efficient operation of the off-loading system.

In addition to the wood fiber materals supplied to pulp paper plants, fuel material in the form of shredded and chipped bark is often shipped from outlying foresting operations and wood processing plants to the pulp plants to be burned to supply process heat. This bark material must be kept segregated from chip fiber material in order to prevent contamination of the latter and, therefore, is usually off-loaded through a separate receiving station in conventional pulp paper plant operations.

In the present off-loading process, however, bark fuel materials can be off-loaded at the single receiving station 200 and directed along the process route normally taken by chip materials, that is, from the railroad car to dumper 12, to segregating deck 30, to conveying system 80, and finally to control station 254.

From control station 254, the chipped bark fuel can be directed to the power plant (not shown) for consumption or can be diverted to bark fuel storage facility, such as storage facility 270, by suitable conveyor means such as conveyor 274.

The present process and apparatus can also accommodate shipments of mixed bark fuel and roundwood. As herein embodied, for the case where a mixture of roundwood and bark fuel is unloaded at station 200, the mixture is directed along the process route normally taken by roundwood; that is, from deck 30 to conveyor systems 82 by the action of plow member 52*b*. In this operation, the debarking apparatus 262 performs the further process step of separating the bark fuel material from the roundwood and diverting it from the roundwood flow path along conveyor system 272 for appropriate further processing or to storage facility 270. The close cooperation of the plowing member, 62*b*, with the deck surface 36 and wall member 36 and wall member 52 (see FIG. 2) insures that the sorting deck 30 will be substantially cleared of the fuel material following the translation of 62*a* or 62*b* and that little or no contamination of subsequent chip fiber materials will occur.

It will be apparent to those skilled in the art that various modifications and variations could be made in the apparatus and method disclosed herein without departing from the scope or spirit of the invention.

What is claimed is:

1. Apparatus for receiving, segregating, and temporarily storing material transferred at an elevated position from a receiver box of a rotary railroad car dumper, the material being one of at least two forms, the material also being expelled from the dumper along an unloading axis, the apparatus comprising:

(a) stationary platform means including
 (i) a horizontally disposed planar deck member for supporting simultaneously the at least two different forms of material expelled,
 (ii) means for supporting said deck member substantially at the elevation of the receiver box;
(b) means for coupling the receiver box to said platform means for guiding material being expelled onto said deck member;
(c) means cooperating with said platform means and said coupling means for plowing the expelled material along said deck member in a selectable one of a plurality of directions, the dimensions of the deck member in each of said plurality of directions being sufficient to store temporarily the segregated material.

2. The apparatus as in claim 1 wherein the at least two forms of material expelled from the rotary dumper is wood fiber material in wood chip form and roundwood form, the roundwood being either tree-length or pulp wood-length logs, the wood fiber material being intended for use in a pulp paper manufacturing operation, wherein the deck member is rectangular and has a dimension of at least about 65 feet along the unloading axis and wherein the temporary material storage capacity of the platform is about two times the capacity of the receiver box in each plowing direction.

3. The apparatus as in claim 1 wherein the unloading axis is parallel to the axis of rotation of the dumper and the material is expelled through an opening at one end of the receiver box, and wherein said coupling means includes a vertical planar wall member fixedly attached, and perpendicular, to said deck member, the end of the receiver box through which the material is expelled being parallel to and in sliding engagement with said wall member, said wall member also having an aperture for alignment with the receiver box opening when the receiver box is in its coupled position.

4. The apparatus as in claim 3 wherein said plowing means moves the expelled material in the selected direction along an axis perpendicular to the unloading axis, and wherein the plowing means further includes:

(a) a plurality of vertically disposed plowing members each having a planar face oriented perpendicular to the plowing axis, a bottom edge parallel to the upper surface of said deck member, and a pair of opposite ends, the one of said ends proximate said wall member having a vertical edge;
(b) tracking means cooperating with both of said ends of each of said plowing members for guiding each plow member in translating motion along said plowing axis and for supporting said bottom edge above said deck member and for spacing said vertical edge of each of said gate members from said wall member distances sufficient to allow relative motion therebetween; and
(c) means for translating each of said plurality of plowing members along said plowing axis, said deck member and said wall member acting to channel the material being moved by action of said plowing member.

5. The apparatus as in claim 4 wherein said plowing means includes two plowing members, each of said two plow members operative to move material in a different direction along said plowing axis.

6. The apparatus as in claim 4 wherein said translating means includes cable drive means connected to both of said ends of each of said plurality of plowing members, and wherein each of said plowing member includes hinge means connecting the one of said ends proximate said wall member with said track means for accommodating canting of the plowing member during uneven loading thereof.

7. Apparatus for unloading, segregating and distributing material carried by open-topped railroad cars, the material being in at least two separate forms, the apparatus comprising, in combination:

(a) a rotary railroad car dumper, said rotary dumper including a receiver box elevated in a rest position;
(b) a platform for segregating and temporarily storing the segregated material, said platform being at substantially the same elevation as the rotary dumper receiver box in rest position;
(c) piston means cooperating with said rotary dumper and said platform for transferring material from said receiver box in rest position to said platform, said material having been unloaded into said receiver box during rotation of a railroad car by said dumper;

(d) distributing means for transporting sorted material away from said platform, said distributing means including at least two seperate conveying systems each for carrying a particular one of the material forms;

(e) plowing means cooperating with said platform for segregating the transferred material and for clearing the segregated material from said platform and onto said conveying means, the platform temporary storage capacity allowing substantially continuous operation of the respective one of said conveying systems for transporting away material of one form during the unloading, segregating and conveying material of the other form.

8. The apparatus as in claim 7 wherein said platform includes a generally horizontal planar deck member and wherein said plowing means includes a plurality of vertical plowing members, each of said vertical members having a planar face, a bottom edge in sliding conformity with the upper surface of said deck and a pair of opposite ends, and wherein said apparatus further includes means for translating said vertical members along said deck member.

9. The apparatus as in claim 8 wherein said translating means includes (i) tracking means for supporting and guiding said translating plowing members and (ii) cable drive means for applying driving force to both of said pair of opposite ends of each of said vertical members, each of said vertical members also including hinge means cooperating with said track means for accommodating canting of said vertical member about a vertical axis during application of uneven driving forces at said opposite ends.

* * * * *